United States Patent [19]

Taylor

[11] Patent Number: 4,976,765

[45] Date of Patent: Dec. 11, 1990

[54] METHOD OF MAKING GLASS-CERAMIC LASER GYROSCOPE FRAME

[75] Inventor: Mark P. Taylor, Painted Post, N.Y.

[73] Assignee: Corning Incorporated, Corning, N.Y.

[21] Appl. No.: 351,715

[22] Filed: May 15, 1989

[51] Int. Cl.$^5$ .............................................. C03C 10/00
[52] U.S. Cl. ............................................ 65/33; 65/43
[58] Field of Search ................. 65/33, 43, 42, 36, 32.2

[56] References Cited

U.S. PATENT DOCUMENTS

| | | | |
|---|---|---|---|
| 3,486,871 | 12/1969 | Martin | 65/33 |
| 3,663,244 | 5/1972 | Martin | 501/69 |
| 4,135,038 | 1/1979 | Takami et al. | 174/52.4 |
| 4,386,853 | 6/1983 | Ljung | 356/350 |
| 4,405,722 | 9/1983 | Kokubu et al. | 501/15 |
| 4,421,947 | 12/1983 | Kyle | 501/15 |
| 4,515,898 | 5/1985 | Davis et al. | 501/15 |
| 4,592,794 | 6/1986 | Davis et al. | 357/80 |
| 4,707,458 | 11/1987 | Chyung et al. | 501/69 |
| 4,727,638 | 3/1988 | Altmann et al. | 29/417 |
| 4,800,421 | 1/1989 | Davis et al. | 357/80 |

FOREIGN PATENT DOCUMENTS

| | | | |
|---|---|---|---|
| 2309484 | 11/1976 | France | 65/43 |
| 49-89713 | 8/1974 | Japan | 65/43 |
| 50-55612 | 5/1975 | Japan | 65/43 |
| 63-315536 | 12/1988 | Japan . | |
| 6415210 | 12/1964 | Netherlands | 65/33 |

OTHER PUBLICATIONS

Freiser et al., Divitrified Frit Seal Glass for Sealing Gas Panels, IBM Technical Disclosure Bulletin, vol. 18, No. 10, p. 3221, 3/1976.

Primary Examiner—Kenneth M. Schor
Assistant Examiner—John J. Bruckner
Attorney, Agent, or Firm—Clinton S. Janes, Jr.

[57] ABSTRACT

This invention provides a method for forming ring laser gyroscope frames without extensive machining. Parts of necessary configurations for such frames are so fashioned that they can be sealed together into a unit. Those parts are prepared from very low expansion glass-ceramics of particular compositions and are sealed together with low expansion, thermally devitrifiable sealing glasses, also of particular compositions.

4 Claims, No Drawings

METHOD OF MAKING GLASS-CERAMIC LASER GYROSCOPE FRAME

BACKGROUND OF THE INVENTION

The production of ring laser gyroscopes, as currently practiced, has involved the use of frame blanks made from glass-ceramics. Extensive machining of those frames (drilling gain bores, wells, anode and cathode ports, and fill holes to provide an optical gyroscope support containing internal channels for helium-neon gas encapsulation, and optically finishing edges for prism and mirror attachments) is quite apparently a very expensive and time consuming practice.

Therefore, the primary objective of the present invention was to design a method for producing such frames wherein the drilling would be eliminated and finishing would be limited to the optically contacted surfaces.

SUMMARY OF THE INVENTION

A ring laser gyroscope has a plane of mirror symmetry passing through all of the drilled holes. Accordingly, I questioned whether it might be possible to accomplish the above objective by forming two halves of the frame along this plane of symmetry and thereafter bonding the two halves into an integral unit. Because of the environments to which ring laser gyroscopes may be exposed, it seemed that the two halves should consist of a glass-ceramic and those two halves should be bonded together by means of a thermally crystallizable glass frit. Hence, in view of the fact that a glass-ceramic article is prepared through the controlled heat treatment of a precursor glass body, the two halves could be formed into a desired shape as glasses, which would then be subjected to the necessary heat treatment to crystallize the glass halves in situ to glass-ceramics. And, inasmuch as the final dimensions of the resulting glass-ceramic halves can be quite carefully controlled, further finishing would be essentially limited to the optically contacted surfaces. However, in order to successfully accomplish the proposed inventive method, the materials to be used therein must satisfy a number of critical requirements. To illustrate:

First, the frame material must exhibit a very low linear coefficient of thermal expansion (less than $1 \times 10^{-7}/°C$. over the temperature range of $-50°$ to $+100°$ C.) where the gyroscope will be used in navigation applications;

Second, the frame material must be transparent in order to permit inspection;

Third, because the frame halves will most preferably be formed by pressing, the frame material must demonstrate melting and viscosity characteristics which permit gobbing of molten glass and pressing in a mold;

Fourth, the frame material (as a glass-ceramic) must be capable of being heated to frit bonding temperatures without manifesting any substantial change in thermal expansion;

Fifth, the thermal expansion of the frit (as crystallized) must be relatively close to that of the glass-ceramic frame material;

Sixth, the frit (as a glass) must flow sufficiently well to provide a hermetic seal at temperatures within the stability range of the glass-ceramic frame material; and Seventh, the frit (as crystallized) must be essentially impermeable to helium gas.

Because of the very demanding melting and viscosity characteristics which must be exhibited in the precursor glass plus the extremely vital physical properties that must be demonstrated in the glass-ceramic, particularly the critically low coefficient of thermal expansion, it was determined that the glass-ceramic halves should be prepared from compositions described in U.S. Pat. No. 4,707,458. The glass-ceramics disclosed in that patent contain $\beta$-quartz solid solution as essentially the sole crystal phase and consist essentially, expressed in terms of percent weight on the oxide basis, of

| $SiO_2$ | 64–67 | ZnO | 0.7–4.2 |
|---|---|---|---|
| $Al_2O_3$ | 21–24 | $TiO_2$ | 2.0–3.25 |
| $Li_2O$ | 2.6–3.7 | $ZrO_2$ | 1.25–2.5 |
| MgO | 0.5–1.5 | $TiO_2 + ZrO_2$ | 4–5.25 |
| BaO | 0–1 | $As_2O_3$ | 0–1 |

The precursor glass bodies prepared from those compositions are crystallized in situ to glass-ceramics by first heating to about 700°–750° C. to develop nuclei therein and then further heating the nucleated body to about 800°–850° C. to grow crystals of $\beta$-quartz solid solution on the nuclei.

One glass-ceramic having a composition encompassed within that patent which appears to be especially desirable for use as gyroscope frame parts is Corning Code 9600, marketed by Corning Incorporated, Corning, N.Y., which has the following approximate composition, expressed in terms of weight percent on the oxide basis:

| $SiO_2$ | 65.9 | ZnO | 1.6 |
|---|---|---|---|
| $Al_2O_3$ | 21.7 | $TiO_2$ | 2.7 |
| $Li_2O$ | 3.3 | $ZrO_2$ | 1.7 |
| MgO | 1.3 | $As_2O_3$ | 0.7 |
| BaO | 0.8 | | |

In order to discover a frit suitable for bonding two halves of a gyroscope frame together formed from glass-ceramic included within U.S. Pat. No. 4,707,458, the following two experiments were devised for testing the capability of various frit compositions:

In the first experiment, a plate of Corning Code 9600 glass-ceramic was polished, as was one end of a 96% silica glass tube marketed by Corning Incorporated under the o trademark VYCOR ®. The frit to be tested was admixed into an organic vehicle (desirably #175 pine oil or #324 squeege oil from Drakenfeld Color Company, Washington, Pa.) to form a frit slip and that slip was applied to the polished end of the VYCOR ® tube by dipping that end thereinto. The tube was then placed in an upright position onto the polished surface of the glass-ceramic plate with the coated end downward, and a weight placed atop the other end of the tube to assure tight contact with the glass-ceramic surface. That assembly was introduced into an electrically-fired, air atmosphere furnace and heated at a rate of about 300° C./hour to 750° C. (that temperature being sufficiently low to have essentially no effect upon the thermal expansion of the glass-ceramic). After maintaining that temperature for one-half hour to form a seal, the electric current to the furnace was cut off and the furnace allowed to cool to room temperature with the assembly retained therewith.

The assembly was withdrawn from the furnace and the weight removed from atop the tube. The open end of the tube was connected to the analyzer of a mass spectrometer through a graded seal and a helium filled bag was then attached around the outside of the assembly in such a manner as to form an enclosure therefor. Vacuum was thereafter applied to the tube and the level of helium coming into the analyzer measured. That experiment demonstrated that the seal was hermetic and the helium permeability was no higher than the glass tube.

In the second experiment, one member of Corning Code 7971, a glass marketed by Corning Incorporated under the trademark ULE fused silica glass, was bonded between two members of Corning Code 9600 glass-ceramic through the frit to be tested. Corning Code 7971 glass has the approximate analysis of 92.5% $SiO_2$ and 7.5% $TiO_2$ and exhibits a linear coefficient of thermal expansion (0°–300° C.) of about $0.3 \times 10^{-7}/°C$. The thermal expansion of the two glass-ceramic outer members was determined by measuring the stress in the glass inner member resulting from temperature changes. The purpose of the experiment was to ascertain whether the temperature required to assure a sound frit seal exerts any substantial effect upon the thermal expansion of the glass-ceramic.

I have found that above-stated requirements for a frit to be operable in bonding together parts of gyroscope frames prepared from glass-ceramic described in U.S. Pat. No. 4,707,458, while exhibiting very low permeability to helium gas, can be achieved in certain thermally crystallizable glass frit composition within the $PbO-TiO_2-Al_2O_3-B_2O_3-SiO_2$ system. Thus, the operable frits have compositions consisting essentially, expressed in terms of weight percent in the oxide basis, of about 62–68% PbO, 12–20% $TiO_2$, 1–3% $Al_2O_3$, 1–3% $B_2O_3$, and 12–18% $SiO_2$. When fired to a temperature between about 700°–800° C. to sinter the frit particles together into an integral mass, in situ crystallization occurs within the mass, this crystallization consisting predominantly of a lead titanate phase having a perovskite-type structure. Firing times of as little as 0.25 hour may be sufficient, but safer practice to assure sound bonding and a high percentage of crystallinity dictates sintering periods of up to 3 hours, depending upon the temperatures employed, with about 0.5–2 hours being preferred. Hence, the precursor glass demonstrates a high linear coefficient of thermal expansion but, when highly crystallized, the material exhibits a linear coefficient of thermal expansion (0°–300° C.) less than $30 \times 10^{-7}/°C$. Accordingly, the sintering heat treatment will be continued for a sufficient period of time to achieve high crystallinity, commonly >50% by volume.

In general terms, my inventive method comprises five basic steps:

(1) members of such predetermined configurations that, when sealed together, they will form a ring laser gyroscope frame are prepared from a glass-ceramic having a composition encompassed within U.S. Pat. No. 4,707,458;

(2) a coating of a thermally devitrifiable frit having a composition within the above-described ranges is applied onto the surfaces of the members that are to be sealed together;

(3) the frit coated surfaces of the members are brought into contact with each other;

(4) at least the frit coated, contacting surfaces of the members are heated to a temperature between about 700°–800° C. for a sufficient length of time to form a fusion seal between the contacting surfaces, thereby producing an integral body (a ring laser gyroscope frame), and to effect the in situ crystallization of lead titanate crystals in the seal; and then (5) cooling the body to room temperature.

The article produced from my inventive method comprises a ring laser gyroscope frame composed of individual preformed members prepared from glass-ceramics consisting essentially of a composition included within U.S. Pat. No. 4,707,458 which are fusion sealed into an integral body through a thermally devitrifiable frit consisting essentially of a composition within the above-described ranges which, during fusion sealing, crystallizes in situ to lead titanate crystals having a perovskite-type structure.

PRIOR ART

U.S. Pat. No. 3,486,871 discloses thermally devitrifiable frit sealing glasses in which, upon sintering, lead titanate crystals having a perovskite-type structure are developed in situ. Those glasses consisted essentially, in weight percent, of 60–80% PbO, 5–18% $TiO_2$, at least 1% $B_2O_3$, at least 5% $SiO_2$, the total $B_2O_3 + SiO_2$ being 10–20%, and 0–2% $Al_2O_3$. The frits could be sintered into a fusion seal at temperatures of 500°–650° C. The coefficients of thermal expansion (0°–300° C.) reported for the working examples ranged over $48-70 \times 10^{-7}/°C$. Therefore, although there is apparent overlap in the composition intervals disclosed in the patent and those of the frits operable in the present invention, the low sintering temperatures evidence basic differences existing between the frits of the patent and those operable in the instant invention. Furthermore, and most importantly, no mention is made of joining together parts of ring laser gyroscope frames using a sealing frit. Yet, that is the very crux of the present invention.

U.S. Pat. No. 3,663,244 describes enamels for decorating glass-ceramic articles, which enamels are prepared from thermally devitrifiable glass frits which, upon sintering, crystallize in situ to form lead titanate crystals having a perovskite-type structure. The frits consisted essentially, in weight percent, of 62–68% PbO, 12–16% $TiO_2$, 14–20% $SiO_2$, 2–4% $Al_2O_3$, and up to 2% total of one or more oxides selected from the group of $B_2O_3$, BaO, $P_2O_5$, and ZnO. The frits could be matured into a glaze by firing at a temperature between about 700°–850° C. The linear coefficients of thermal expansion (0°–300° C.) were stated to range about $15-30 \times 10^{-7}/°C$. Again, there is overlap between the composition intervals disclosed in the patent and those operable in the instant invention. But also again, however, there is no reference to frit bonding together parts of ring laser gyroscope frames and the physical properties such frits must demonstrate to perform that function.

DESCRIPTION OF PREFERRED EMBODIMENTS

The table below records the compositions, expressed in terms of parts by weight on the oxide basis, of two glass frits which are operable in the present invention. Inasmuch as the sum of the individual components totals or very closely approximates 100, for all practical purposes the values reported in the table ma be deemed to reflect weight percent. The actual batch ingredients may comprise any materials, either oxides or other compounds, which, when melted together, will be converted into the desired oxide in the proper proportions. For example, $H_3BO_3$ may constitute the source of $B_2O_3$.

The batch materials were compounded, carefully mixed together, and charged into platinum crucibles. The crucibles were introduced into a furnace operating at about 1200°-1300° C. and the batches were melted for about 1-3 hours. The molten glass was "cocktail mixed" six times, i.e., the molten glass was poured from one crucible into another and back again six times, and then poured as a stream into a container of water to form small particles of glass. This latter practice is termed "drigaging" in the art. Thereafter, those glass particles were dried and subsequently milled to powder having an average grain size of less than 10 microns.

|  | 1 | 2 |
|---|---|---|
| PbO | 64 | 65.3 |
| $TiO_2$ | 16 | 18.1 |
| $SiO_2$ | 16 | 12.4 |
| $Al_2O_3$ | 2 | 1.98 |
| $B_2O_3$ | 2 | 1.57 |

Example 1 exhibited a linear coefficient of thermal expansion (0°-300° C.) of about $28 \times 10^{-7}/°C$. and Example 2 demonstrated a linear coefficient of thermal expansion (0°-300° C.) of about $18 \times 10^{-7}/°C$.

A slip was prepared from each powder, termed frit, by admixing the frit into #175 pine oil by Drakenfeld in proportions of 4.5 parts of vehicle to 25 parts of frit. After only a few minutes of hand mixing, the frit was uniformly dispersed within the vehicle and the viscosity of the slip was at a level to allow easy manual spreading, but sufficiently thick to inhibit substantial spontaneous flow. The slip can then be applied as a thin layer via a spatula to the gyroscope frame parts fashioned from Corning Code 9600 glass-ceramic. (It will be appreciated that layers of more precise dimensions can be prepared through such means as doctor blading, dipping, silk screening, and spraying, and the viscosity of the slip for use in such means will be adjusted therefor.) A preliminary flat grinding of the frame surfaces can be advantageous in assuring an even contact along the surfaces of the parts. A gentle abrasion of the frame surface prior to applying the slip may also be useful in assuring good bonding. The coated frame parts will be brought together in proper alignment; e.g., they can be mounted and held in a jig constructed of materials capable of resisting high temperatures such as stainless steel or a super alloy. That assembly will then be moved into an electrically heated kiln and fired at temperatures between about 750°-780° C. for about 0.5 hour to cause the frit to flow and to concurrently develop in situ a high percentage of lead titanate crystals exhibiting a perovskite structure, thereby resulting in a hermetic seal between the frame parts. The application of some pressure on the parts during firing may be helpful in securing good bonding. One especially effective firing schedule is set out below:

Heat from room temperature to 780° C. at 60° C./hour

Hold at 780° C. for one hour

Cool from 780° C. to 500° C. at 150° C./hour

Cut off electric current and allow kiln to cool with assembly therein

A final finishing to trim sprues, remove any traces of flash from the bonding frit, etc., may be necessary to assure very accurate dimensional and shape control, as well as the optically contacted surfaces.

When subjected to the above-described experiment for determining the resistance to permeability of helium gas, the hermetic seal to the VYCOR ® tube made by Example 1 passed helium at a rate no faster than the VYCOR ® tube itself. When expressly tested for helium gas permeability, a pressed and fired disc of Example 2 demonstrated a performance quite comparable to that of Corning Code 9600 glass-ceramic.

When subjected to the above-described experiment for determining whether the frit bonding schedule affected the thermal expansion of Corning Code 9600 glass-ceramic, no substantial effect was observed.

I claim:

1. A method for making ring laser gyroscope frames by sealing individual preformed members into an integral body which comprises the following steps:
   (1) forming members of predetermined configuration from glass-ceramics exhibiting a linear coefficient of thermal expansion of less than $1 \times 10^{-7}/°C$. within the temperature range of from $-50°$ C. to $+100°$ C., said members consisting essentially, expressed in terms of weight percent on the oxide basis, of

| $SiO_2$ | 64–67 | ZnO | 0.7–4.2 |
|---|---|---|---|
| $Al_2O_3$ | 21–24 | $TiO_2$ | 2.0–3.25 |
| $Li_2O$ | 2.6–3.7 | $ZrO_2$ | 1.25–2.5 |
| MgO | 0.1–1.5 | $TiO_2 + ZrO_2$ | 4–5.25 |
| BaO | 0–1 | $As_2O_3$ | 0–1 |

(2) applying a coating of a thermally devitrifiable frit consisting essentially, expressed in terms of weight percent on the oxide basis, of 62–68% PbO, 12–20% $TiO_2$, 12–18% $SiO_2$, 1–3% $Al_2O_3$, and 1–3% $B_2O_3$ onto the surfaces of said members to be sealed together;
   (3) bringing the frit coated surfaces of said members into contact with one another;
   (4) heating at least the frit coated contacting surfaces of said members to a temperature between about 700°–800° C. for a period of time sufficient to effect a fusion seal between the contacting surfaces, thereby forming an integral body, and to cause the in situ crystallization of lead titanate crystals having a perovskite structure in said seal, such that said seal exhibits a linear coefficient of thermal expansion of less than $30 \times 10^{-7}/°C$. within the temperature range of from 0° to 300° C.; and then
   (5) cooling the integral body to room temperature.

2. A method according to claim 1 wherein said glass-ceramic has the approximate composition by weight percent of

| $SiO_2$ | 65.9 | MgO | 1.3 | $TiO_2$ | 2.7 |
|---|---|---|---|---|---|
| $Al_2O_3$ | 21.7 | BaO | 0.8 | $ZrO_2$ | 1.7 |
| $Li_2O$ | 3.3 | ZnO | 1.6 | $As_2O_3$ | 0.7. |

3. A method according to claim 1 wherein said thermally devitrifiable frit has an approximate composition by weight percent selected from the group consisting of

|  |  |  |  |  |  |
|---|---|---|---|---|---|
|  | PbO | 64 |  | PbO | 65.3 |
|  | $TiO_2$ | 16 |  | $TiO_2$ | 18.1 |
| I | $SiO_2$ | 16 | and II | $SiO_2$ | 12.4 |
|  | $Al_2O_3$ | 2 |  | $Al_2O_3$ | 1.98 |
|  | $B_2O_3$ | 2 |  | $B_2O_3$ | 1.57 |

4. A method according to claim 1 wherein said period of time sufficient to effect a fusion seal and cause in situ crystallization ranges from about 025 to 3 hours.

* * * * *